US012673535B2

(12) United States Patent
Kwon et al.

(10) Patent No.: US 12,673,535 B2
(45) Date of Patent: Jul. 7, 2026

(54) VEHICULAR THERMAL MANAGEMENT MODULE

(71) Applicants: HYUNDAI MOTOR COMPANY, Seoul (KR); KIA CORPORATION, Seoul (KR)

(72) Inventors: Chun Kyu Kwon, Hwaseong-si (KR); Jong Woo Nam, Seoul (KR); Yong Woong Cha, Yongin-si (KR); Hyun Sub Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 134 days.

(21) Appl. No.: 18/509,770

(22) Filed: Nov. 15, 2023

(65) Prior Publication Data
US 2025/0074140 A1     Mar. 6, 2025

(30) Foreign Application Priority Data
Sep. 6, 2023     (KR) ........................ 10-2023-0118579

(51) Int. Cl.
| | |
|---|---|
| *B60H 1/32* | (2006.01) |
| *B60H 1/00* | (2006.01) |
| *F25B 41/40* | (2021.01) |
| *F25B 43/00* | (2006.01) |

(52) U.S. Cl.
CPC ....... *B60H 1/3229* (2013.01); *B60H 1/00278* (2013.01); *B60H 1/00385* (2013.01); *B60H*

*1/00542* (2013.01); *F25B 41/40* (2021.01); *F25B 43/006* (2013.01)

(58) Field of Classification Search
CPC ............ B60H 1/00271; B60H 1/00278; B60H 1/00571; B60H 1/3227; B60H 1/3228; B60H 1/32281; B60H 1/32284; B60H 1/3229; F25B 41/40; F25B 41/42; F25B 43/006
See application file for complete search history.

(56) References Cited

U.S. PATENT DOCUMENTS

| | | | | | |
|---|---|---|---|---|---|
| 6,438,985 | B1 * | 8/2002 | Hayashi | ................ | F24F 1/0003 |
| | | | | | 62/298 |
| 9,109,840 | B2 * | 8/2015 | Kadle | ................ | B60H 1/32284 |
| 10,369,863 | B2 * | 8/2019 | Connell | ................ | F25B 43/006 |
| 10,486,494 | B2 * | 11/2019 | Koberstein | ........ | B60H 1/00899 |
| 10,625,572 | B2 * | 4/2020 | Duerr | .................... | F28D 9/0093 |
| 11,440,376 | B2 * | 9/2022 | Calderone | .............. | F25B 41/40 |
| 11,453,267 | B2 * | 9/2022 | Koberstein | ........ | B60H 1/00907 |
| 11,453,268 | B2 * | 9/2022 | Meiselman | .......... | B60H 1/3229 |
| 11,479,077 | B2 * | 10/2022 | Kim | .................... | B60H 1/32284 |
| 12,083,860 | B2 * | 9/2024 | Kim | .................... | B60H 1/3229 |
| 12,122,218 | B2 * | 10/2024 | You | .................... | B60H 1/00485 |

(Continued)

*Primary Examiner* — Christopher R Zerphey
(74) *Attorney, Agent, or Firm* — MCDONNELL BOEHNEN HULBERT & BERGHOFF LLP

(57)     ABSTRACT

A vehicular thermal management module includes a low-temperature-side manifold having a low-temperature refrigerant passage, a high-temperature-side manifold having a high-temperature refrigerant passage, and facing the low-temperature-side manifold, a compressor disposed between the low-temperature-side manifold and the high-temperature-side manifold, and an accumulator connected to an inlet of the compressor through a refrigerant line.

12 Claims, 2 Drawing Sheets

(56) References Cited

U.S. PATENT DOCUMENTS

| | | | |
|---|---|---|---|
| 12,168,385 B2* | 12/2024 | Tang | B60H 1/2221 |
| 12,291,082 B2* | 5/2025 | Son | B60H 1/3229 |
| 12,296,641 B2* | 5/2025 | Morimoto | F25B 41/40 |
| 2016/0375740 A1* | 12/2016 | Duerr | F28F 3/08 |
| | | | 62/506 |
| 2020/0047591 A1* | 2/2020 | He | B60H 1/32284 |
| 2022/0194167 A1* | 6/2022 | Morimoto | B60H 1/00571 |
| 2022/0297504 A1* | 9/2022 | Schroeder | B60H 1/00542 |
| 2024/0034126 A1* | 2/2024 | Rhee | B60H 1/00342 |
| 2024/0167769 A1* | 5/2024 | Rhee | B60K 11/02 |
| 2024/0391300 A1* | 11/2024 | Dziubinschi | F25B 43/006 |
| 2025/0010692 A1* | 1/2025 | Kwak | B60H 1/3223 |
| 2025/0033430 A1* | 1/2025 | Hashimoto | B60H 1/00271 |
| 2025/0058605 A1* | 2/2025 | Woo | B60H 1/32281 |
| 2025/0153546 A1* | 5/2025 | Han | B60H 1/00 |

* cited by examiner

VEHICULAR THERMAL MANAGEMENT MODULE

CROSS REFERENCE TO RELATED APPLICATIONS

This application is based on and claims the benefit of priority to Korean Patent Application No. 10-2023-0118579, filed on Sep. 6, 2023, in the Korean Intellectual Property Office, the disclosure of which is incorporated herein in its entirety by reference.

TECHNICAL FIELD

The present disclosure relates to a vehicular thermal management module, and more particularly, to a vehicular thermal management module designed to simplify the layout of a vehicular thermal management system by modularizing at least a portion of the vehicular thermal management system.

BACKGROUND

In recent years, with a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

Electric vehicles or hybrid vehicles may include a vehicular thermal management system for air conditioning in a passenger compartment and maintaining a battery and/or power electronic components at optimal temperatures. The vehicular thermal management system may include a heating, ventilation, and air conditioning (HVAC) subsystem for air conditioning in the passenger compartment, a power electronics cooling subsystem designed to maintain the power electronic components of a power electronics system at appropriate temperatures, and a battery cooling subsystem designed to maintain the battery at an appropriate temperature.

Meanwhile, the vehicular thermal management system becomes important to ensure sufficient electric efficiency and all electric range (AER) of the electric vehicle. Accordingly, the layout of the thermal management system of the electric vehicle may become very complex, and the manufacturing cost and weight thereof may increase.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicular thermal management module designed to simplify the layout of a vehicular thermal management system by modularizing at least a portion of the vehicular thermal management system, thereby reducing the manufacturing cost and weight thereof.

According to an aspect of the present disclosure, a vehicular thermal management module may include a low-temperature-side manifold having a low-temperature refrigerant passage, a high-temperature-side manifold having a high-temperature refrigerant passage, and facing the low-temperature-side manifold, a compressor positioned between the low-temperature-side manifold and the high-temperature-side manifold, and an accumulator connected to an inlet of the compressor through a refrigerant line.

An outlet of the accumulator may be fluidly connected to the inlet of the compressor, the low-temperature-side manifold may be fluidly connected to an inlet of the accumulator, and the high-temperature-side manifold may be fluidly connected to an outlet of the compressor.

At least a portion of an inverter controlling the compressor may contact the low-temperature-side manifold.

At least a portion of the accumulator may contact the high-temperature-side manifold.

The vehicular thermal management module may further include a low-temperature-side heat exchanger block contacting the low-temperature-side manifold. The low-temperature-side heat exchanger block may have a refrigerant passage through which a refrigerant passes, and a coolant passage fluidly connected to a coolant circulation path.

The low-temperature-side manifold may have an inlet passage fluidly communicating with an inlet of the refrigerant passage of the low-temperature-side heat exchanger block, and an outlet passage fluidly communicating with an outlet of the refrigerant passage of the low-temperature-side heat exchanger block.

The vehicular thermal management module may further include a front block part fluidly connected to an exterior heat exchanger adjacent to a front grille of a vehicle.

The front block part may have a plurality of internal passages fluidly connected to the exterior heat exchanger, the high-temperature-side manifold, and the low-temperature-side manifold.

The front block part may have an expansion valve embedded therein, and the expansion valve may be fluidly connected to an inlet of the low-temperature-side heat exchanger block.

The vehicular thermal management module may further include a rear block part fluidly connected to an evaporator and an interior condenser positioned in an HVAC casing of an HVAC subsystem. The rear block part may have a plurality of internal passages fluidly connected to the evaporator, the interior condenser, the high-temperature-side manifold, and the low-temperature-side manifold.

The low-temperature-side manifold may have a supply passage fluidly connected to an outlet of the exterior heat exchanger and an inlet of the evaporator.

The vehicular thermal management module may further include a high-temperature-side heat exchanger block contacting the high-temperature-side manifold. The high-temperature-side heat exchanger block may have a refrigerant passage through which the refrigerant passes, and a coolant passage fluidly connected to a coolant circulation path.

The front block part may include a high-temperature-side control valve embedded therein. The high-temperature-side control valve may be configured to allow the refrigerant discharged from the compressor to be directed to at least one of the exterior heat exchanger, the expansion valve, the high-temperature-side heat exchanger block, and the interior condenser.

The high-temperature-side manifold may have an inlet passage fluidly communicating with an inlet of the refrigerant passage of the high-temperature-side heat exchanger block, and an outlet passage fluidly communicating with an outlet of the refrigerant passage of the high-temperature-side heat exchanger block.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
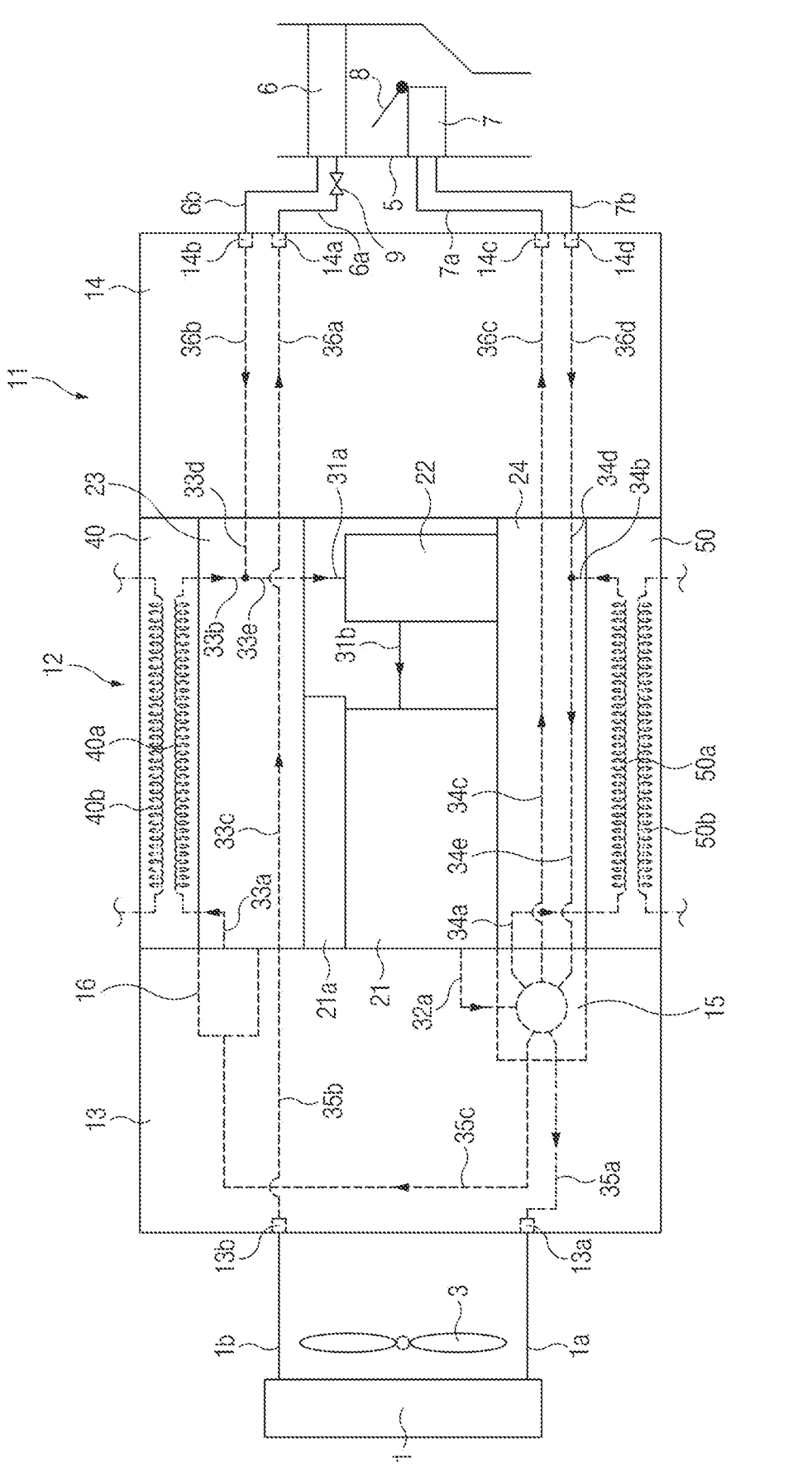
FIG. 1 illustrates the configuration of a vehicular thermal management module according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicular thermal management system according to an exemplary embodiment of the present disclosure may include a heating, ventilation, and air conditioning (HVAC) subsystem for air conditioning in a passenger compartment, a power electronics (PE) cooling subsystem designed to maintain PE components of a PE system at appropriate temperatures, and a battery cooling subsystem designed to maintain a battery at an appropriate temperature.

The HVAC subsystem may include a refrigerant circulation path through which a phase-changing refrigerant circulates, and a plurality of components (a compressor, an interior condenser, an expansion valve, an evaporator, an exterior heat exchanger, a battery chiller, and the like) disposed on the refrigerant circulation path. That is, the HVAC subsystem may be a refrigerant system in which the phase-changing refrigerant circulates.

The PE cooling subsystem may include a PE coolant circulation path through which a PE coolant for cooling the plurality of PE components (an electric motor, an inverter, an autonomous driving controller, an autonomous driving high-performance computer, and the like) circulates, and one or more heat exchangers and pumps disposed on the PE coolant circulation path. That is, the PE cooling subsystem may be a coolant system in which the PE coolant that keeps its phase (the coolant does not undergo a phase change) circulates.

The battery cooling subsystem may include a battery coolant circulation path through which a battery coolant for cooling the battery circulates, and a battery chiller and a pump disposed on the battery coolant circulation path. That is, the battery cooling subsystem may be a coolant system in which the battery coolant that keeps its phase (the coolant does not undergo a phase change) circulates.

Referring to FIG. 1, a vehicular thermal management module according to an exemplary embodiment of the present disclosure may be configured to modularize at least a portion of the above-described thermal management system.

The vehicular thermal management module according to an exemplary embodiment of the present disclosure may include a module body 11 and a cavity 12 defined within the module body 11.

The module body 11 may be hardware for modularizing at least a portion of the thermal management system. The module body 11 may serve as a rectangular parallelepiped or cubic box-shaped case or housing, and the cavity 12 may be defined in a central portion of the module body 11. For example, the module body 11 may include a front block part 13 facing the front of the vehicle, a rear block part 14 facing a passenger compartment of the vehicle, and a pair of side block parts (not shown). The front block part 13, the rear block part 14, and the pair of side block parts may define the cavity 12, and the top and bottom of the cavity 12 may be opened.

The cavity 12 of the module body 11 may receive a compressor 21 of the HVAC subsystem which is a refrigerant system, and an accumulator 22 fluidly connected to an inlet of the compressor 21.

The compressor 21 may compress the refrigerant, and the accumulator 22 may separate a liquid refrigerant from the refrigerant, thereby preventing the liquid refrigerant from flowing into the compressor 21. The compressor 21 and the accumulator 22 may be located in the middle of the cavity 12. An inlet-side conduit 31a may be connected to an inlet of the accumulator 22, and an outlet-side conduit 31b may be connected to an outlet of the accumulator 22. The outlet of the accumulator 22 may be fluidly connected to the inlet of the compressor 21 through the outlet-side conduit 31b.

The vehicular thermal management module according to an exemplary embodiment of the present disclosure may include an inverter 21a controlling the compressor 21, and at least a portion of the inverter 21a may contact a low-temperature-side manifold 23. Accordingly, the inverter 21a may be cooled by the low-temperature-side manifold 23.

At least a portion of the accumulator 22 may contact a high-temperature-side manifold 24. Accordingly, the refrigerant received in the accumulator 22 may additionally absorb heat from the refrigerant passing through an internal passage of the high-temperature-side manifold 24 so that the refrigerant may be superheated.

The vehicular thermal management module according to an exemplary embodiment of the present disclosure may include the low-temperature-side manifold 23 fluidly connected to the inlet of the accumulator 22, and the high-temperature-side manifold 24 fluidly connected to an outlet of the compressor 21.

The low-temperature-side manifold 23 and the high-temperature-side manifold 24 may face each other in the cavity 12 of the module body 11, and the compressor 21 and the accumulator 22 may be disposed between the lowtemperature-side manifold 23 and the high-temperature-side manifold 24. Accordingly, the low-temperature-side manifold 23 and the high-temperature-side manifold 24 may be spaced apart from each other by the compressor 21 and the accumulator 22.

Referring to FIG. 1, the low-temperature-side manifold 23 may be received in the cavity 12 of the module body 11, and the low-temperature-side manifold 23 may have a plate shape located above the compressor 21 and the accumulator 22 in the cavity 12 of the module body 11. The low-temperature-side manifold 23 may have a plurality of internal passages 33a, 33b, 33c, 33d, and 33e defined therein, and the refrigerant may pass through the plurality of internal passages 33a, 33b, 33c, 33d, and 33e. The low-temperature refrigerant may be directed into the accumulator 22 through the internal passages 33a, 33b, 33c, 33d, and 33e of the low-temperature-side manifold 23.

Referring to FIG. 1, the high-temperature-side manifold 24 may be received in the cavity 12 of the module body 11, and the high-temperature-side manifold 24 may have a plate shape located below the compressor 21 and the accumulator 22 in the cavity 12 of the module body 11. The high-temperature-side manifold 24 may have a plurality of internal passages 34a, 34b, 34c, 34d, and 34e defined therein, and the refrigerant may pass through the plurality of internal passages 34a, 34b, 34c, 34d, and 34e.

As described above, the low-temperature-side manifold 23 and the high-temperature-side manifold 24 may be separated by the compressor 21 and the accumulator 22, and accordingly heat transfer between the low-temperature-side manifold 23 and the high-temperature-side manifold 24 may be blocked by the compressor 21 and the accumulator 22 so that heat loss of the vehicular thermal management system may be minimized.

Referring to FIG. 1, the front block part 13 may have a discharge passage 32a communicating with the outlet of the compressor 21, and a high-temperature-side control valve 15 fluidly connected to the discharge passage 32a. The discharge passage 32a may be defined in the front block part 13, and the outlet of the compressor 21 may be fluidly connected to the high-temperature-side control valve 15 through the discharge passage 32a. The high-temperature-side control valve 15 may be a ball valve embedded in the front block part 13, and the high-temperature-side control valve 15 may be configured to control the flow of the refrigerant discharged from the compressor 21. The high-temperature-side control valve 15 may be tightly attached to a front edge of the high-temperature-side manifold 24.

Referring to FIG. 1, the front block part 13 may have an expansion valve 16 embedded therein, and the expansion valve 16 may be tightly attached to a front edge of the low-temperature-side manifold 23.

Referring to FIG. 1, the front block part 13 may be disposed to face a front grille of the vehicle, and the front block part 13 may have a plurality of internal passages 35a, 35b, and 35c by which an exterior heat exchanger 1, the high-temperature-side manifold 24, and the low-temperature-side manifold 23 are fluidly connected. The plurality of internal passages 35a, 35b, and 35c may be defined in the front block part 13. The plurality of internal passages 35a, 35b, and 35c may include a supply passage 35a allowing the refrigerant discharged from the high-temperature-side control valve 15 to be directed to the exterior heat exchanger 1, a discharge passage 35b allowing the refrigerant discharged from the exterior heat exchanger 1 to be directed to an expansion valve 9, and a bypass passage 35c allowing the refrigerant discharged from the high-temperature-side control valve 15 to be directed to the expansion valve 16.

Referring to FIG. 1, the front block part 13 may have a supply port 13a and a discharge port 13b provided on a front surface thereof. The supply port 13a may be provided at an end of the supply passage 35a, and the discharge port 13b may be provided at an end of the discharge passage 35b.

The exterior heat exchanger 1 may be disposed adjacent to the front grille of the vehicle, and a cooling fan 3 may be disposed behind the exterior heat exchanger 1. Ambient air may pass by an exterior surface of the exterior heat exchanger 1.

The exterior heat exchanger 1 may have a refrigerant passage formed therein. An inlet-side conduit 1a may be connected to an inlet of the refrigerant passage of the exterior heat exchanger 1, and an outlet-side conduit 1b may be connected to an outlet of the refrigerant passage of the exterior heat exchanger 1. The refrigerant passing through the refrigerant passage of the exterior heat exchanger 1 may exchange heat with the ambient air passing by the exterior surface of the exterior heat exchanger 1. An end of the inlet-side conduit 1a and the supply port 13a of the front block part 13 may be joined in a sealed manner, and an end of the outlet-side conduit 1b and the discharge port 13b of the front block part 13 may be joined in a sealed manner.

Referring to FIG. 1, the vehicular thermal management module according to an exemplary embodiment of the present disclosure may include a low-temperature-side heat exchanger block 40 contacting the low-temperature-side manifold 23. The low-temperature-side heat exchanger block 40 may be joined to a top surface of the low-temperature-side manifold 23 using fasteners, welding, and/or the like. The low-temperature-side heat exchanger block 40 may be received in the cavity 12 of the module body 11, and the low-temperature-side heat exchanger block 40 may be tightly attached to the top surface of the low-temperature-side manifold 23. The low-temperature-side heat exchanger block 40 may have a refrigerant passage 40a through which the refrigerant discharged from the expansion valve 16 passes, and a coolant passage 40b fluidly connected to a coolant circulation path. According to an exemplary embodiment, the low-temperature-side heat exchanger block 40 may be a battery chiller used for cooling the battery, and the coolant circulation path may be a battery coolant circulation path through which the battery coolant circulates.

Referring to FIG. 1, the low-temperature-side manifold 23 may have an inlet passage 33a fluidly communicating with an inlet of the refrigerant passage 40a of the low-temperature-side heat exchanger block 40, and an outlet passage 33b fluidly communicating with an outlet of the refrigerant passage 40a of the low-temperature-side heat exchanger block 40. The inlet passage 33a may fluidly communicate with the expansion valve 16, and the low-temperature refrigerant expanded by the expansion valve 16 may pass through the inlet passage 33a, the refrigerant passage 40a of the low-temperature-side heat exchanger block 40, and the outlet passage 33b. Accordingly, the refrigerant passing through the refrigerant passage 40a of the low-temperature-side heat exchanger block 40 may absorb heat from the coolant passing through the coolant passage 40b of the low-temperature-side heat exchanger block 40 so that the refrigerant may be evaporated and the coolant may be cooled. Thus, the low-temperature-side heat exchanger block 40 may serve as an evaporator that allows the low-temperature refrigerant to be evaporated by the coolant.

Referring to FIG. 1, the low-temperature-side manifold 23 may have a supply passage 33c fluidly communicating with the discharge passage 35b of the front block part 13, and the supply passage 33c may be fluidly connected to the outlet of the exterior heat exchanger 1 through the discharge passage 35b of the front block part 13 and the outlet-side conduit 1b of the exterior heat exchanger 1. In particular, the supply passage 33c may be configured to fluidly connect the outlet of the exterior heat exchanger 1 and an inlet of an evaporator 6 disposed in an HVAC casing 5. The low-temperature refrigerant discharged from the exterior heat exchanger 1 may be directed to the evaporator 6 through the outlet-side conduit 1b, the discharge passage 35b of the front block part 13, and the supply passage 33c. The refrigerant discharged from the exterior heat exchanger 1 may pass through the supply passage 33c of the low-temperature-side manifold 23 so that the refrigerant cooled by the exterior heat exchanger 1 may be additionally cooled by the low-temperature-side manifold 23.

The rear block part 14 may be disposed to face the HVAC casing 5 adjacent to the passenger compartment. The rear block part 14 may have a plurality of internal passages 36a, 36b, 36c, and 36d by which the evaporator 6, an interior condenser 7, the low-temperature-side manifold 23, and the high-temperature-side manifold 24 are fluidly connected. Referring to FIG. 1, the plurality of internal passages 36a, 36b, 36c, and 36d may be defined in the rear block part 14. The plurality of internal passages 36a, 36b, 36c, and 36d may include a first supply passage 36a allowing the low-temperature refrigerant discharged from the supply passage 33c of the low-temperature-side manifold 23 to be directed to the evaporator 6, a first discharge passage 36b allowing the refrigerant discharged from the evaporator 6 to be directed to the accumulator 22, a second supply passage 36c allowing the high-temperature refrigerant discharged from a supply passage 34c of the high-temperature-side manifold 24 to be directed to the interior condenser 7, and a second discharge passage 36d allowing the refrigerant discharged from the interior condenser 7 to be directed to the high-temperature-side control valve 15.

The evaporator 6 and the interior condenser 7 may be disposed within the HVAC casing 5, and the interior condenser 7 may be located on the downstream side of the evaporator 6 in an air flow direction inside the HVAC casing 5. An air mixing door 8 may be disposed between the evaporator 6 and the interior condenser 7. The evaporator 6 may have a refrigerant passage formed therein. An inlet-side conduit 6a may be connected to an inlet of the refrigerant passage of the evaporator 6, and an outlet-side conduit 6b may be connected to an outlet of the refrigerant passage of the evaporator 6. The expansion valve 9 may be disposed on the inlet-side conduit 6a of the evaporator 6, and the refrigerant may be expanded by the expansion valve 9 and then be directed to the inlet of the evaporator 6. The interior condenser 7 may have a refrigerant passage formed therein. An inlet-side conduit 7a may be connected to an inlet of the refrigerant passage of the interior condenser 7, and an outlet-side conduit 7b may be connected to an outlet of the refrigerant passage of the interior condenser 7.

The rear block part 14 may have a first supply port 14a, a first discharge port 14b, a second supply port 14c, and a second discharge port 14d provided on a rear surface thereof. The first supply port 14a may be provided at an end of the first supply passage 36a, and the first discharge port 14b may be provided at an end of the first discharge passage 36b. The second supply port 14c may be provided at an end of the second supply passage 36c, and the second discharge port 14d may be provided at an end of the second discharge passage 36d. An end of the inlet-side conduit 6a of the evaporator 6 and the first supply port 14a may be joined in a sealed manner, and an end of the outlet-side conduit 6b of the evaporator 6 and the first discharge port 14b may be joined in a sealed manner. An end of the inlet-side conduit 7a of the interior condenser 7 and the second supply port 14c may be joined in a sealed manner, and an end of the outlet-side conduit 7b of the interior condenser 7 and the second discharge port 14d may be joined in a sealed manner.

Referring to FIG. 1, the low-temperature-side manifold 23 may have a connection passage 33d fluidly communicating with the first discharge passage 36b, and a return passage 33e fluidly communicating with the inlet-side conduit 31a of the accumulator 22. The connection passage 33d and the outlet passage 33b may be joined to the return passage 33e. The return passage 33e of the low-temperature-side manifold 23 may fluidly communicate with the inlet-side conduit 31a of the accumulator 22. The refrigerant discharged from the outlet passage 33b of the low-temperature-side manifold 23 may return to the accumulator 22 through the return passage 33e and the inlet-side conduit 31a of the accumulator 22. In addition, the refrigerant discharged from the evaporator 6 may return to the accumulator 22 through the outlet-side conduit 6b, the first discharge passage 36b of the rear block part 14, the connection passage 33d, the return passage 33e, and the inlet-side conduit 31a of the accumulator 22.

Referring to FIG. 1, the vehicular thermal management module according to an exemplary embodiment of the present disclosure may include a high-temperature-side heat exchanger block 50 contacting the high-temperature-side manifold 24. The high-temperature-side heat exchanger block 50 may be joined to a bottom surface of high-temperature-side manifold 24 using fasteners, welding, and/or the like. The high-temperature-side heat exchanger block 50 may be received in the cavity 12 of the module body 11, and the high-temperature-side heat exchanger block 50 may be tightly attached to the bottom surface of the high-temperature-side manifold 24. The high-temperature-side heat exchanger block 50 may have a refrigerant passage 50a fluidly connected to the internal passages 34a and 34b of the high-temperature-side manifold 24, and a coolant passage 50b fluidly connected to a coolant circulation path. According to an exemplary embodiment, the high-temperature-side heat exchanger block 50 may be a battery warmer, and the coolant circulation path may be a battery coolant circulation path.

Referring to FIG. 1, the high-temperature-side manifold 24 may have an inlet passage 34a fluidly communicating with an inlet of the refrigerant passage 50a of the high-temperature-side heat exchanger block 50, and an outlet passage 34b fluidly communicating with an outlet of the refrigerant passage 50a of the high-temperature-side heat exchanger block 50. The inlet passage 34a may fluidly communicate with the high-temperature-side control valve 15, and the high-temperature refrigerant discharged from the high-temperature-side control valve 15 may pass through the inlet passage 34a, the refrigerant passage 50a of the high-temperature-side heat exchanger block 50, and the outlet passage 34b. Accordingly, the refrigerant passing through the refrigerant passage 50a of the high-temperature-side heat exchanger block 50 may release heat to the coolant passing through the coolant passage 50b of the high-temperature-side heat exchanger block 50 so that the refrigerant may be cooled and the coolant may be heated. Thus, the hightemperature-side heat exchanger block 50 may serve as a condenser that allows the high-temperature refrigerant to be condensed by the coolant.

Referring to FIG. 1, the high-temperature-side manifold 24 may have the supply passage 34c fluidly communicating with the second supply passage 36c of the rear block part 14, and the supply passage 34c of the high-temperature-side manifold 24 may fluidly communicate with the high-temperature-side control valve 15. The high-temperature refrigerant discharged from the high-temperature-side control valve 15 may be directed to the interior condenser 7 of the HVAC casing 5 through the supply passage 34c of the high-temperature-side manifold 24, the second supply passage 36c of the rear block part 14, and the inlet-side conduit 7a.

Referring to FIG. 1, the high-temperature-side manifold 24 may have a connection passage 34d fluidly communicating with the second discharge passage 36d of the rear block part 14, and a return passage 34e fluidly communicating with the high-temperature-side control valve 15. The connection passage 34d and the outlet passage 34b may be joined to the return passage 34e. Accordingly, the refrigerant discharged from the interior condenser 7 and the refrigerant passage 50a of the high-temperature-side heat exchanger block 50 may return to the high-temperature-side control valve 15 through the return passage 34e.

The high-temperature-side control valve 15 may be configured to control the flow of the refrigerant in a manner that allows the high-temperature refrigerant discharged from the compressor 21 to be directed to at least one of the interior condenser 7, the expansion valve 16, the exterior heat exchanger 1, and the refrigerant passage 50a of the high-temperature-side heat exchanger block 50.

When the high-temperature refrigerant discharged from the compressor 21 is directed to the inlet-side conduit 1a of the exterior heat exchanger 1 through the supply passage 35a by a first switching operation of the high-temperature-side control valve 15, the high-temperature refrigerant passing through the refrigerant passage of the exterior heat exchanger 1 may be cooled by the air passing by the exterior surface of the exterior heat exchanger 1 and then be directed to the expansion valve 9 and the evaporator 6 through the outlet-side conduit 1b of the exterior heat exchanger 1, the discharge passage 35b of the front block part 13, the supply passage 33c of the low-temperature-side manifold 23, the first supply passage 36a of the rear block part 14, and the inlet-side conduit 6a of the evaporator 6. The refrigerant may be evaporated by the air passing through the inside of the HVAC casing 5, and the evaporated refrigerant may be discharged from the outlet of the evaporator 6, and then return to the accumulator 22 through the outlet-side conduit 6b of the evaporator 6, the first discharge passage 36b of the rear block part 14, the connection passage 33d of the low-temperature-side manifold 23, the return passage 33e of the low-temperature-side manifold 23, and the inlet-side conduit 31a of the accumulator 22.

When the high-temperature refrigerant discharged from the compressor 21 is directed to the bypass passage 35c and the expansion valve 16 by a second switching operation of the high-temperature-side control valve 15, the high-temperature refrigerant may be expanded by the expansion valve 16 and then pass through the inlet passage 33a of the low-temperature-side manifold 23, the refrigerant passage 40a of the low-temperature-side heat exchanger block 40, and the outlet passage 33b of the low-temperature-side manifold 23.

When the high-temperature refrigerant discharged from the compressor 21 is directed to the inlet passage 34a of the high-temperature-side manifold 24 by a third switching operation of the high-temperature-side control valve 15, the refrigerant may return to the high-temperature-side control valve 15 through the refrigerant passage 50a of the high-temperature-side heat exchanger block 50, the outlet passage 34b of the high-temperature-side manifold 24, and the return passage 34e of the high-temperature-side manifold 24. The refrigerant having returned to the high-temperature-side control valve 15 may be directed to at least one of the expansion valve 16, the exterior heat exchanger 1, and the interior condenser 7 by various switching operations of the high-temperature-side control valve 15.

When the high-temperature refrigerant discharged from the compressor 21 is directed to the supply passage 34c of the high-temperature-side manifold 24 by a fourth switching operation of the high-temperature-side control valve 15, the refrigerant may be directed to the inlet of the interior condenser 7 through the second supply passage 36c of the rear block part 14 and the inlet-side conduit 7a of the interior condenser 7. The refrigerant discharged from the outlet of the interior condenser 7 may return to the high-temperature-side control valve 15 through the outlet-side conduit 7b of the interior condenser 7, the second discharge passage 36d of the rear block part 14, the connection passage 34d of the high-temperature-side manifold 24, and the return passage 34e of the high-temperature-side manifold 24. The refrigerant having returned to the high-temperature-side control valve 15 may be directed to at least one of the expansion valve 16, the exterior heat exchanger 1, and the refrigerant passage 50a of the high-temperature-side heat exchanger block 50 by various switching operations of the high-temperature-side control valve 15.

Figure 2:
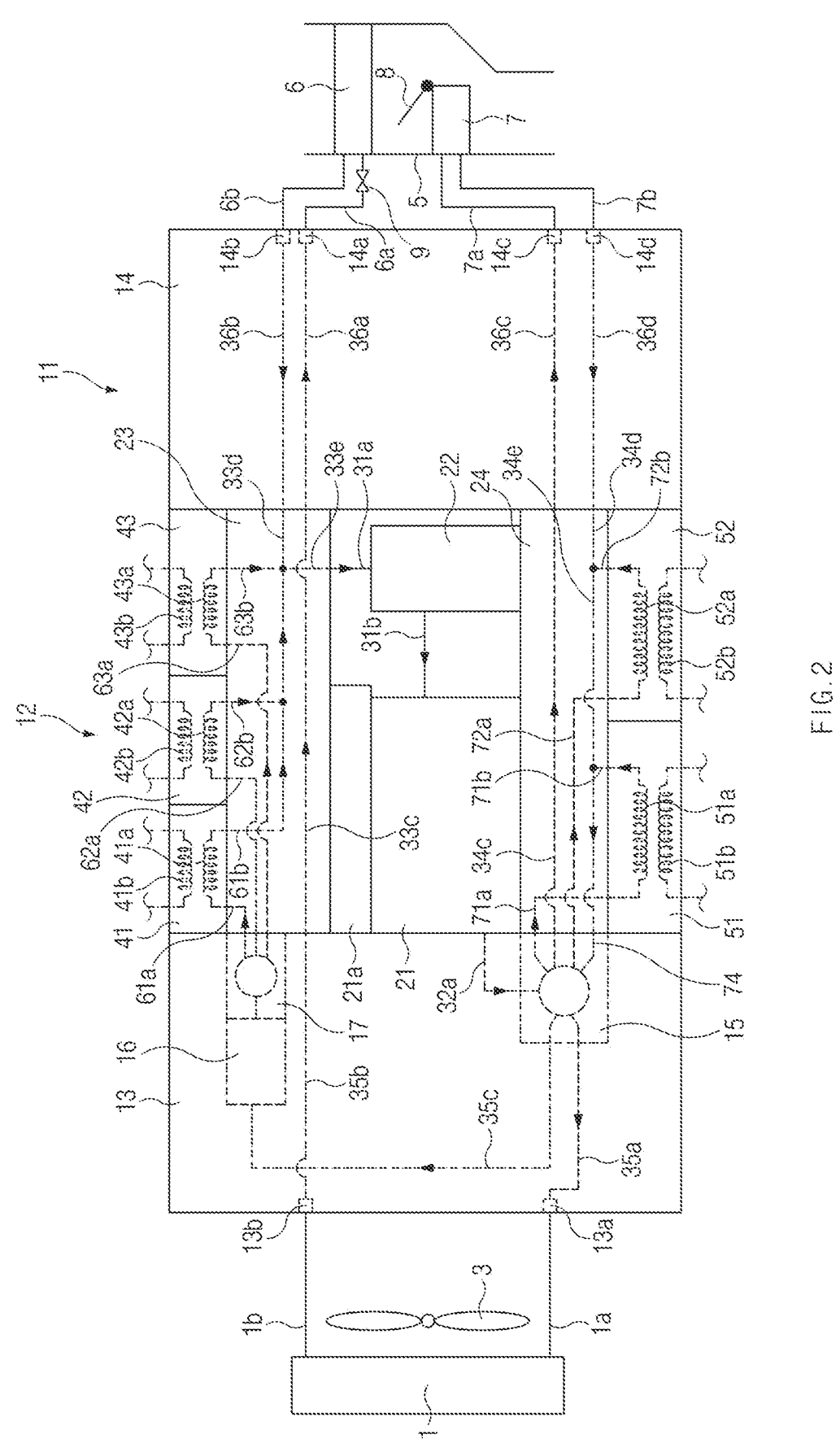
FIG. 2 illustrates the configuration of a vehicular thermal management module according to another exemplary embodiment of the present disclosure.

FIG. 2 illustrates the configuration of a vehicular thermal management module according to another exemplary embodiment of the present disclosure. Referring to FIG. 2, the vehicular thermal management module according to another exemplary embodiment of the present disclosure may include a plurality of low-temperature-side heat exchanger blocks 41, 42, and 43 disposed on the top surface of the low-temperature-side manifold 23. For example, a first low-temperature-side heat exchanger block 41, a second low-temperature-side heat exchanger block 42, and a third low-temperature-side heat exchanger block 43 may be tightly attached to the top surface of the low-temperature-side manifold 23.

The first low-temperature-side heat exchanger block 41 may have a first refrigerant passage 41a and a first coolant passage 41b fluidly connected to a coolant circulation path. According to an exemplary embodiment, the first low-temperature-side heat exchanger block 41 may be a battery chiller used for cooling the battery, and the coolant circulation path may be a battery coolant circulation path through which a battery coolant circulates. The low-temperature-side manifold 23 may have a first inlet passage 61a fluidly communicating with an inlet of the first refrigerant passage 41a of the first low-temperature-side heat exchanger block 41, and a first outlet passage 61b fluidly communicating with an outlet of the first refrigerant passage 41a of the first low-temperature-side heat exchanger block 41.

The second low-temperature-side heat exchanger block 42 may have a second refrigerant passage 42a and a second coolant passage 42b fluidly connected to a coolant circulation path. According to an exemplary embodiment, the second low-temperature-side heat exchanger block 42 may be a chiller used for cooling an autonomous driving high-performance computer, and the coolant circulation path may be a coolant circulation path through which a coolant for cooling the high-performance computer circulates. The low-temperature-side manifold 23 may have a second inlet passage 62*a* fluidly communicating with an inlet of the second refrigerant passage 42*a* of the second low-temperature-side heat exchanger block 42, and a second outlet passage 62*b* fluidly communicating with an outlet of the second refrigerant passage 42*a* of the second low-temperature-side heat exchanger block 42.

The third low-temperature-side heat exchanger block 43 may have a third refrigerant passage 43*a* and a third coolant passage 43*b* fluidly connected to a coolant circulation path. According to an exemplary embodiment, the third low-temperature-side heat exchanger block 43 may be a PE heat exchanger used for cooling the PE components, and the coolant circulation path may be a coolant circulation path through which a PE coolant for cooling the PE components circulates. The low-temperature-side manifold 23 may have a third inlet passage 63*a* fluidly communicating with an inlet of the third refrigerant passage 43*a* of the third low-temperature-side heat exchanger block 43, and a third outlet passage 63*b* fluidly communicating with an outlet of the third refrigerant passage 43*a* of the third low-temperature-side heat exchanger block 43.

The first outlet passage 61*b*, the second outlet passage 62*b*, and the third outlet passage 63*b* of the low-temperature-side manifold 23 may be joined to the return passage 33*e* together with the connection passage 33*d*.

Referring to FIG. 2, the vehicular thermal management module according to another exemplary embodiment of the present disclosure may further include a low-temperature-side control valve 17 configured to control the flow of the refrigerant in a manner that allows the low-temperature refrigerant discharged from the expansion valve 16 to be directed to at least one of the plurality of low-temperature-side heat exchanger blocks 41, 42, and 43. The low-temperature-side control valve 17 may be embedded in the front block part 13 fluidly communicating with the expansion valve 16. The low-temperature-side control valve 17 may be tightly attached to the front edge of the low-temperature-side manifold 23.

Referring to FIG. 2, the vehicular thermal management module according to another exemplary embodiment of the present disclosure may include a plurality of high-temperature-side heat exchanger blocks 51 and 52 disposed on the bottom surface of the high-temperature-side manifold 24. For example, a first high-temperature-side heat exchanger block 51 and a second high-temperature-side heat exchanger block 52 may be tightly attached to the bottom surface of the high-temperature-side manifold 24.

The first high-temperature-side heat exchanger block 51 may have a first refrigerant passage 51*a* and a first coolant passage 51*b* fluidly connected to a coolant circulation path. According to an exemplary embodiment, the first high-temperature-side heat exchanger block 51 may be a battery warmer used for increasing the temperature of the battery, and the coolant circulation path may be a battery coolant circulation path through which the battery coolant circulates. The high-temperature-side manifold 24 may have a first inlet passage 71*a* fluidly communicating with an inlet of the first refrigerant passage 51*a* of the first high-temperature-side heat exchanger block 51, and a first outlet passage 71*b* fluidly communicating with an outlet of the first refrigerant passage 51*a* of the first high-temperature-side heat exchanger block 51.

The second high-temperature-side heat exchanger block 52 may have a second refrigerant passage 52*a* and a second coolant passage 52*b* fluidly connected to a coolant circulation path. According to an exemplary embodiment, the second high-temperature-side heat exchanger block 52 may be a heat exchanger for warming up the PE components, and the coolant circulation path may be a PE coolant circulation path through which the PE coolant circulates. The high-temperature-side manifold 24 may have a second inlet passage 72*a* fluidly communicating with an inlet of the second refrigerant passage 52*a* of the second high-temperature-side heat exchanger block 52, and a second outlet passage 72*b* fluidly communicating with an outlet of the second refrigerant passage 52*a* of the second high-temperature-side heat exchanger block 52.

The first outlet passage 71*b* and the second outlet passage 72*b* of the high-temperature-side manifold 24 may be joined to the return passage 34*e* together with the connection passage 34*d*.

Referring to FIG. 2, the high-temperature-side control valve 15 according to another exemplary embodiment of the present disclosure may be configured to control the flow of the refrigerant in a manner that allows the high-temperature refrigerant discharged from the compressor 21 to be directed to at least one of the interior condenser 7, the expansion valve 16, the exterior heat exchanger 1, the first refrigerant passage 51*a* of the first high-temperature-side heat exchanger block 51, and the second refrigerant passage 52*a* of the second high-temperature-side heat exchanger block 52.

According to the above-described exemplary embodiments of the present disclosure, by modularizing at least a portion of the refrigerant system (the HVAC subsystem) and the coolant system (the battery cooling subsystem, the PE cooling subsystem, and the like), the layout of the vehicular thermal management system may be simplified and the manufacturing cost and weight thereof may be reduced, and related platforms may be added.

According to exemplary embodiments of the present disclosure, at least a portion of the refrigerant system may be modularized so that a refrigerant flow path may be minimized, and thus refrigerant flow resistance may be reduced.

According to exemplary embodiments of the present disclosure, the compressor and the accumulator may be configured to physically separate the low-temperature-side manifold from the high-temperature-side manifold, thereby blocking the heat transfer between the low-temperature-side manifold and the high-temperature-side manifold. Thus, heat loss may be minimized.

According to exemplary embodiments of the present disclosure, the compressor may be closed by the low-temperature-side manifold and the high-temperature-side manifold in the cavity of the module body so that noise of the compressor may be less transferred to the outside.

According to exemplary embodiments of the present disclosure, the number of components/parts may be minimized by reducing the number of expansion valves that expand the refrigerant and the number of control valves that control the flow of the refrigerant, and thus the manufacturing cost and weight of the vehicular thermal management module may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A vehicular thermal management module, comprising:
a module body including a front block part facing a front of a vehicle, a rear block part facing a passenger compartment of the vehicle, and a cavity defined by the front block part and the rear block part;
a low-temperature-side manifold positioned within the internal cavity and having a low-temperature refrigerant passage;
a high-temperature-side manifold positioned within the internal cavity and having a high-temperature refrigerant passage, and facing the low-temperature-side manifold;
a compressor positioned within the internal cavity between the low-temperature-side manifold and the high-temperature-side manifold; and
an accumulator positioned within the internal cavity and connected to an inlet of the compressor through a refrigerant line;
wherein the low-temperature-side manifold includes a first plurality of internal passages configured to direct a low-temperature refrigerant into the accumulator;
wherein the high-temperature-side manifold includes a second plurality of internal passages configured to receive a refrigerant discharged from the compressor; and
wherein an outlet of the accumulator is fluidly connected to the inlet of the compressor, the low-temperature-side manifold is fluidly connected to an inlet of the accumulator, and the high-temperature-side manifold is fluidly connected to an outlet of the compressor.

2. The vehicular thermal management module according to claim 1, wherein at least a portion of an inverter controlling the compressor contacts the low-temperature-side manifold.

3. The vehicular thermal management module according to claim 1, wherein at least a portion of the accumulator contacts the high-temperature-side manifold.

4. The vehicular thermal management module according to claim 1, further comprising a low-temperature-side heat exchanger block contacting the low-temperature-side manifold, wherein the low-temperature-side heat exchanger block has a refrigerant passage through which a refrigerant passes, and a coolant passage fluidly connected to a coolant circulation path.

5. The vehicular thermal management module according to claim 4, wherein the low-temperature-side manifold has an inlet passage fluidly communicating with an inlet of the refrigerant passage of the low-temperature-side heat exchanger block, and an outlet passage fluidly communicating with an outlet of the refrigerant passage of the low-temperature-side heat exchanger block.

6. The vehicular thermal management module according to claim 4, wherein the front block part is fluidly connected to an exterior heat exchanger adjacent to a front grille of a vehicle, wherein the front block part has a plurality of internal passages fluidly connected to the exterior heat exchanger, the high-temperature-side manifold, and the low-temperature-side manifold.

7. The vehicular thermal management module according to claim 6, wherein the front block part has an expansion valve embedded therein, and the expansion valve is fluidly connected to an inlet of the low-temperature-side heat exchanger block.

8. The vehicular thermal management module according to claim 7, wherein the rear block part is fluidly connected to an evaporator and an interior condenser positioned in an HVAC casing of an HVAC subsystem, wherein the rear block part has a plurality of internal passages fluidly connected to the evaporator, the interior condenser, the high-temperature-side manifold, and the low-temperature-side manifold.

9. The vehicular thermal management module according to claim 8, wherein the low-temperature-side manifold has a supply passage fluidly connected to an outlet of the exterior heat exchanger and an inlet of the evaporator.

10. The vehicular thermal management module according to claim 8, further comprising a high-temperature-side heat exchanger block contacting the high-temperature-side manifold, wherein the high-temperature-side heat exchanger block has a refrigerant passage through which the refrigerant passes, and a coolant passage fluidly connected to a coolant circulation path.

11. The vehicular thermal management module according to claim 10, wherein the front block part includes a high-temperature-side control valve embedded therein, and the high-temperature-side control valve is configured to allow the refrigerant discharged from the compressor to be directed to at least one of the exterior heat exchanger, the expansion valve, the high-temperature-side heat exchanger block, and the interior condenser.

12. The vehicular thermal management module according to claim 10, wherein the high-temperature-side manifold has an inlet passage fluidly communicating with an inlet of the refrigerant passage of the high-temperature-side heat exchanger block, and an outlet passage fluidly communicating with an outlet of the refrigerant passage of the high-temperature-side heat exchanger block.

* * * * *